US009729943B2

(12) United States Patent
Cameron et al.

(10) Patent No.: US 9,729,943 B2
(45) Date of Patent: Aug. 8, 2017

(54) UTILITY METER REPORTING NETWORK

(71) Applicant: Trimble Navigation Limited, Sunnyvale, CA (US)

(72) Inventors: John F. Cameron, Los Altos, CA (US); Mark Kuhl, Santa Clara, CA (US)

(73) Assignee: TRIMBLE INC., Sunnyvale, CA (US)

( * ) Notice: Subject to any disclaimer, the term of this patent is extended or adjusted under 35 U.S.C. 154(b) by 517 days.

(21) Appl. No.: 13/799,603

(22) Filed: Mar. 13, 2013

(65) Prior Publication Data

US 2014/0266778 A1 Sep. 18, 2014

(51) Int. Cl.
*G08B 23/00* (2006.01)
*H04Q 9/00* (2006.01)
*G08B 5/22* (2006.01)
*G08B 21/00* (2006.01)
*G08C 19/04* (2006.01)
*H04L 12/28* (2006.01)
*H04M 11/00* (2006.01)

(52) U.S. Cl.
CPC ........... *H04Q 9/00* (2013.01); *H04Q 2209/40* (2013.01); *H04Q 2209/60* (2013.01)

(58) Field of Classification Search
CPC ...................... H04Q 2209/40; H04Q 2209/60
USPC ................ 340/870.02, 7.1, 870.11; 370/392; 455/405
See application file for complete search history.

(56) References Cited

U.S. PATENT DOCUMENTS

| 6,996,215 | B2 * | 2/2006 | MacConnell | ........... H04L 12/12 340/870.02 |
| 7,379,981 | B2 | 5/2008 | Elliott et al. | |
| 7,383,580 | B1 | 6/2008 | Frentz | |
| 7,427,927 | B2 | 9/2008 | Borleske et al. | |
| 7,739,138 | B2 | 6/2010 | Chauhan et al. | |
| 7,782,225 | B2 | 8/2010 | Zigdon et al. | |
| 8,855,832 | B2 * | 10/2014 | Rees | ..................... G06F 1/3206 345/173 |
| 2002/0094799 | A1 * | 7/2002 | Elliott | .................... G01D 4/002 455/405 |
| 2002/0109607 | A1 * | 8/2002 | Cumeralto | ............. H04B 1/713 340/870.02 |
| 2004/0061616 | A1 * | 4/2004 | Fischer | ..................... G06F 1/30 340/657 |
| 2004/0113810 | A1 * | 6/2004 | Mason, Jr. | ............. G01D 4/004 340/870.02 |

(Continued)

*Primary Examiner* — Jack K Wang
(74) *Attorney, Agent, or Firm* — Kilpatrick Townsend & Stockton

(57) ABSTRACT

A utility meter reporting network is disclosed. In one embodiment, an end-point reporting device is configured to collect utility usage data and to convey the utility usage data to a gateway device via a first Industrial, Scientific, and Medical (ISM) radio communication link using a first ISM transceiver operable in the 902 MHz to 928 MHz range. The network further comprises a gateway device comprising a second ISM transceiver for receiving the utility usage data from the end point and a wireless transceiver which is configured to send the utility usage data via an Institute of Electrical and Electronics Engineers (IEEE) 802.11 compliant wireless communication link. The network further comprises a utility office which receives the utility usage data from said gateway device via said IEEE 802.11 compliant wireless communication link.

22 Claims, 6 Drawing Sheets

(56) References Cited

U.S. PATENT DOCUMENTS

| | | | | |
|---|---|---|---|---|
| 2006/0097892 A1* | 5/2006 | Zigdon | ............... | H04B 1/707 340/870.02 |
| 2006/0284784 A1* | 12/2006 | Smith | ............... | G01D 4/008 343/872 |
| 2007/0200729 A1* | 8/2007 | Borleske | ............... | G01D 4/004 340/870.02 |
| 2008/0084833 A1* | 4/2008 | Picard | ............... | G01D 4/004 370/280 |
| 2008/0219210 A1* | 9/2008 | Shuey | ............... | G01D 4/006 370/329 |
| 2010/0305891 A1* | 12/2010 | Rodgers | ............... | G01D 4/004 702/62 |
| 2011/0111700 A1* | 5/2011 | Hackett | ............... | A01G 25/16 455/41.2 |
| 2012/0163213 A1* | 6/2012 | Sanderford, Jr. | ............... | H04Q 9/00 370/252 |

* cited by examiner

500

```
SENDING UTILITY USAGE DATA FROM AN END-POINT REPORTING SOURCE TO A GATEWAY
DEVICE VIA A FIRST INDUSTRIAL, SCIENTIFIC, AND MEDICAL (ISM) RADIO COMMUNICATION
LINK USING A FIRST ISM TRANSCEIVER OPERABLE IN THE 902 MHZ TO 928 MHZ RANGE
510
```

↓

```
RECEIVING THE UTILITY USAGE DATA BY A GATEWAY DEVICE USING A SECOND ISM
TRANSCEIVER
520
```

↓

```
SENDING THE UTILITY USAGE DATA BY THE GATEWAY DEVICE VIA AN INSTITUTE OF
ELECTRICAL AND ELECTRONICS ENGINEERS (IEEE) 802.11 COMPLIANT WIRELESS
COMMUNICATION LINK USING AN IEEE 802.11 COMPLIANT RADIO TRANSCEIVER
530
```

SENDING UTILITY USAGE DATA FROM AN END-POINT REPORTING SOURCE TO A GATEWAY DEVICE VIA A FIRST INDUSTRIAL, SCIENTIFIC, AND MEDICAL (ISM) RADIO COMMUNICATION LINK USING A FIRST ISM TRANSCEIVER OPERABLE IN THE 902 MHZ TO 928 MHZ RANGE
610

RECEIVING THE UTILITY USAGE DATA BY A GATEWAY DEVICE USING A SECOND ISM TRANSCEIVER
620

USING A CELLULAR TELEPHONE TO RETRIEVE THE UTILITY USAGE DATA FROM THE GATEWAY DEVICE VIA AN INSTITUTE OF ELECTRICAL AND ELECTRONICS ENGINEERS (IEEE) 802.11 RADIO LINK IMPLEMENTED BY THE CELLULAR TELEPHONE
630

FIG. 6

UTILITY METER REPORTING NETWORK

BACKGROUND

In many areas, utility companies use wireless technology to facilitate automatic collection of utility use data. For example, a wireless transceiver and antenna can be coupled with a meter and the utility use data can be read using a handheld device which directly contacts the wireless transceiver coupled with the meter. As a result, the collection of billing data can be performed more quickly and reliably than when a person had to manually access the meter and record the utility use data. Alternatively, the wireless transceiver can periodically send the utility use data to, for example, a pole-mounted (e.g., a utility pole or the like) radio transceiver. The pole-mounted transceiver then sends the utility use data to a utility office using a cellular telephone connection.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

FIG. 5 is a flowchart of a method for collecting utility usage data in accordance with an embodiment.

FIG. 6 is a flowchart of a method for collecting utility usage data in accordance with an embodiment.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Figure 1:
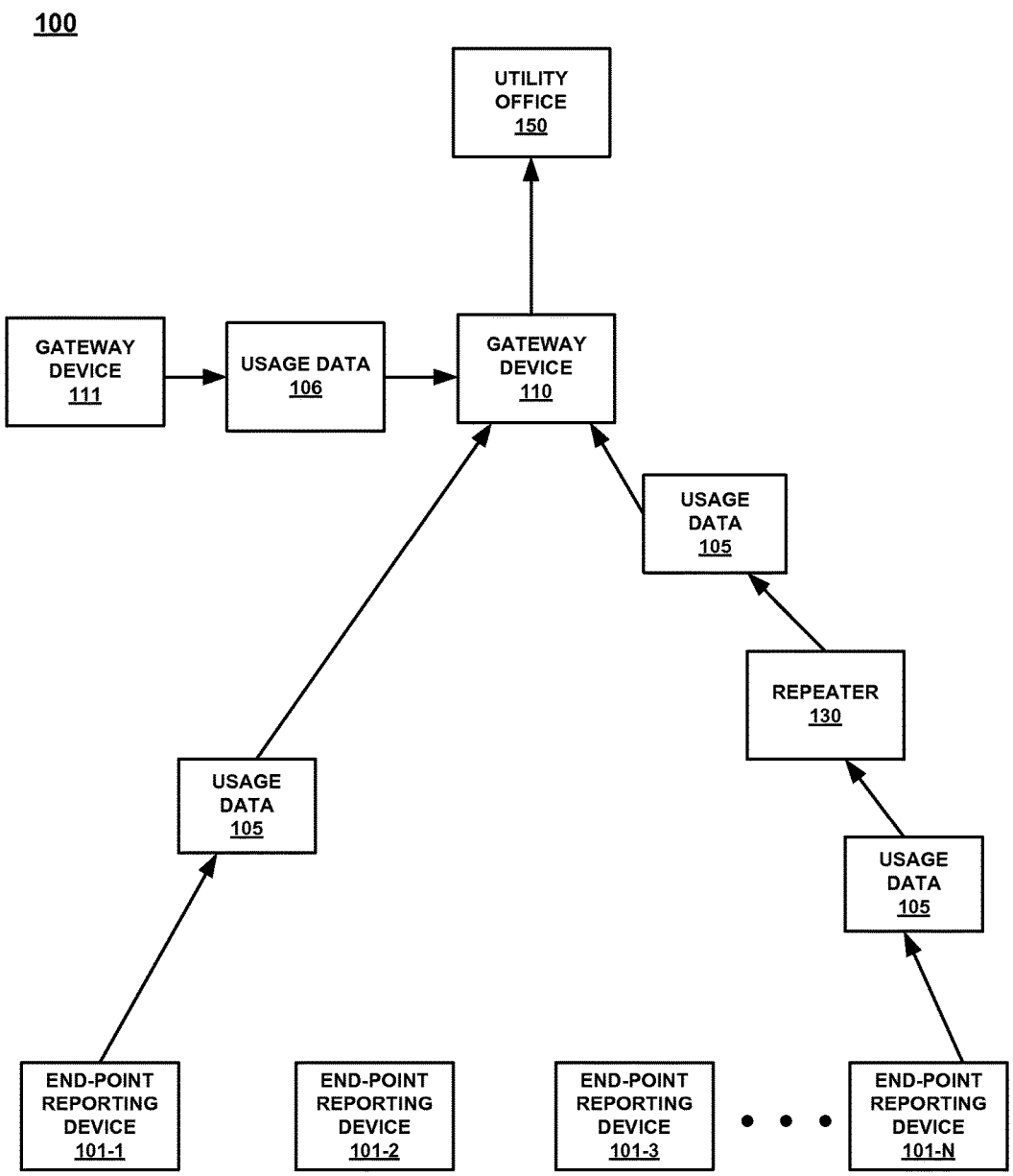
FIG. 1 is a diagram of a utility meter reporting network in accordance with one embodiment.

FIG. 1 is a diagram of a utility meter reporting network 100 in accordance with one embodiment. In FIG. 1, utility meter reporting network 100 comprises a plurality of end-point reporting devices (e.g., 101-1, 101-2, 101-3 ... 101-N) which are communicatively coupled with a gateway device 110. As will be described in greater detail below, end-point reporting devices 101-1 to 101N are configured to collect utility usage data 105 and to send that data to gateway device 110 using a wireless communication link. As an example, end-point reporting devices 101-1 to 101N can be configured to collect and report utility usage data 105 in conjunction with a water meter, a natural gas meter, or an electric meter. It is noted that embodiments are not limited to reporting data from a utility meter alone. However, the present discussion will be directed to utility usage reporting for the purpose of clarity.

As will be discussed in greater detail below, in one embodiment, end-point reporting devices 101-1 to 101N convey utility usage data 105 wirelessly to gateway device 110 using an Industrial, Scientific, and Medical (ISM) radio transceiver (e.g., ISM transceiver 320 of FIG. 3) which operates in the 902-928 MHz frequency range. In accordance with various embodiments, end-point reporting devices 101-1 to 101N can report utility usage data 105 to gateway device 110 at pre-determined time intervals, continuously, or in response to a message generated by gateway device 110.

In FIG. 1, a repeater 130 is shown. Repeater 130 is used in instances when a signal from end-point reporting devices 101-1 to 101N is blocked with reference to gateway device 110. For example, end-point reporting device 101-N may be disposed behind a wall, or other obstacle, which degrades the reception of signals received at gateway device 110. Repeater 130 can be placed at a location which has better signal reception from end-point reporting device 101-N. Repeater 130 receives utility usage data 105 sent by end-point reporting device 101-N and forwards that data wirelessly to gateway device 110. In accordance with one embodiment, repeater 130 comprises an ISM transceiver (not shown) and generates a message using the ISM transceiver conveying the utility usage data 105 to gateway device 110. However, it is noted that the message conveying utility usage data 105 to gateway device 110 can use a separate radio transceiver operable at a different radio frequency than the ISM radio band. For example, in one embodiment repeater 130 comprises a second transceiver which operates an implementation of the Institute of Electrical and Electronics Engineers (IEEE) 802.11 standards for Wi-Fi networks.

In accordance with various embodiments, gateway device 110 is configured to receive and store utility usage data 105 from end-point reporting devices 101-1 to 101N and to forward that data to utility office 150. In accordance with various embodiments, gateway device 110 comprises an ISM transceiver (e.g., 410 of FIG. 4) for receiving utility usage data 105 from end-point reporting devices 101-1 to 101N and/or repeater 130. Gateway device further comprises a wireless transceiver (e.g., 420) for conveying the utility usage data 105 to utility office 150, or to other devices which are authorized to communicate with gateway device 110. It is noted that gateway device 110 is not limited to wireless communications alone when communicating with utility office 150. For example, gateway device 110 can also be configured with a wired communication interface (not shown) such as an Ethernet cable, fiber-optics cable, or the like to convey the utility usage data 105 to utility office 150 via a wired communication link. Additionally, gateway device 110 can utilize a cellular communications device (not shown) to convey the utility usage data 105 to utility office 150 via a cellular communications network. As discussed above, gateway device 110 can receive utility usage data 105 from end-point reporting devices 101-1 to 101N at predetermined time intervals. These intervals can be hourly, daily, weekly, etc. Alternatively, the time interval can change throughout a given time period. For example, during peak usage hours, a customer, or utility office 150, may desire a more detailed representation of utility usage. Thus, during peak usage hours, the reporting interval for sending utility usage data 105 can be 1 minute, while the non-peak hours reporting interval can be every 10 minutes. In one embodiment, gateway device 110 can generate a message to end-point reporting devices 101-1 to 101N to increase or decrease the time interval for sending utility usage data 105. For example, if it is suspected that there is a water-main break, a command can be forwarded via gateway device 110 to provide continuous reporting of utility usage data 105 to gateway device 110. As will be discussed in greater detail below, this facilitates determining if unusually high rates of utility usage are occurring, or if there is a problem with end-point reporting device 101 itself.

In accordance with an embodiment, gateway device 110 can also receive utility usage data (e.g., 106 of FIG. 1) from a second gateway device (e.g., 111 of FIG. 1) which is communicatively coupled with a respective end-point reporting device(s) (not shown) in a separate network. In other words, second gateway device 111 can receive utility usage data 106 from one or more end-point reporting devices of a respective reporting network using, for example, an ISM radio transceiver 410 of FIG. 4. Then, second gateway device 111 can forward utility usage data 106 to gateway device 110 using, for example, a wireless transceiver 420 of FIG. 4. Gateway device 110 is configured to store utility usage data 106 (e.g., in volatile memory 450, or data storage device 470) and to forward utility usage data 106 to utility office 150. The forwarding of utility usage data 105 and 106 can be according to a pre-determined time schedule, in response to a message from utility office 150, or when communications are established, or re-established, with utility office 150. In accordance with one embodiment, utility usage data 105 and 106 will be retained (e.g., in volatile memory 450, or data storage device 470) of gateway device 110 and/or second gateway device 111 until utility office 150 generates a message confirming the reception of utility usage data 105 and/or 106. In one embodiment, utility usage data 105 and/or 106 can be erased from storage upon gateway device 110 in response to a confirmation message from utility office 150 indicating that utility usage data 105 and/or 106 have been received. In another embodiment, utility usage data 106 is erased from storage upon gateway device 110 in response to a confirmation message from utility office 150 indicating that utility usage data 106 has been received. However, utility usage data 105 will still be stored by gateway device 110 for a pre-determined time period (e.g., 30 days, 60 days, etc.) for each end-point reporting device 101-1 to 101N with which it is communicatively coupled. In one embodiment, gateway device 110 is configured to generate a message to second gateway device 111 indicating that utility usage data 106 has been received by utility office 150. In response, second gateway device 111 can delete utility usage data 106 from memory, or store utility usage data 106 as described above with reference to gateway device 110.

Figure 2:
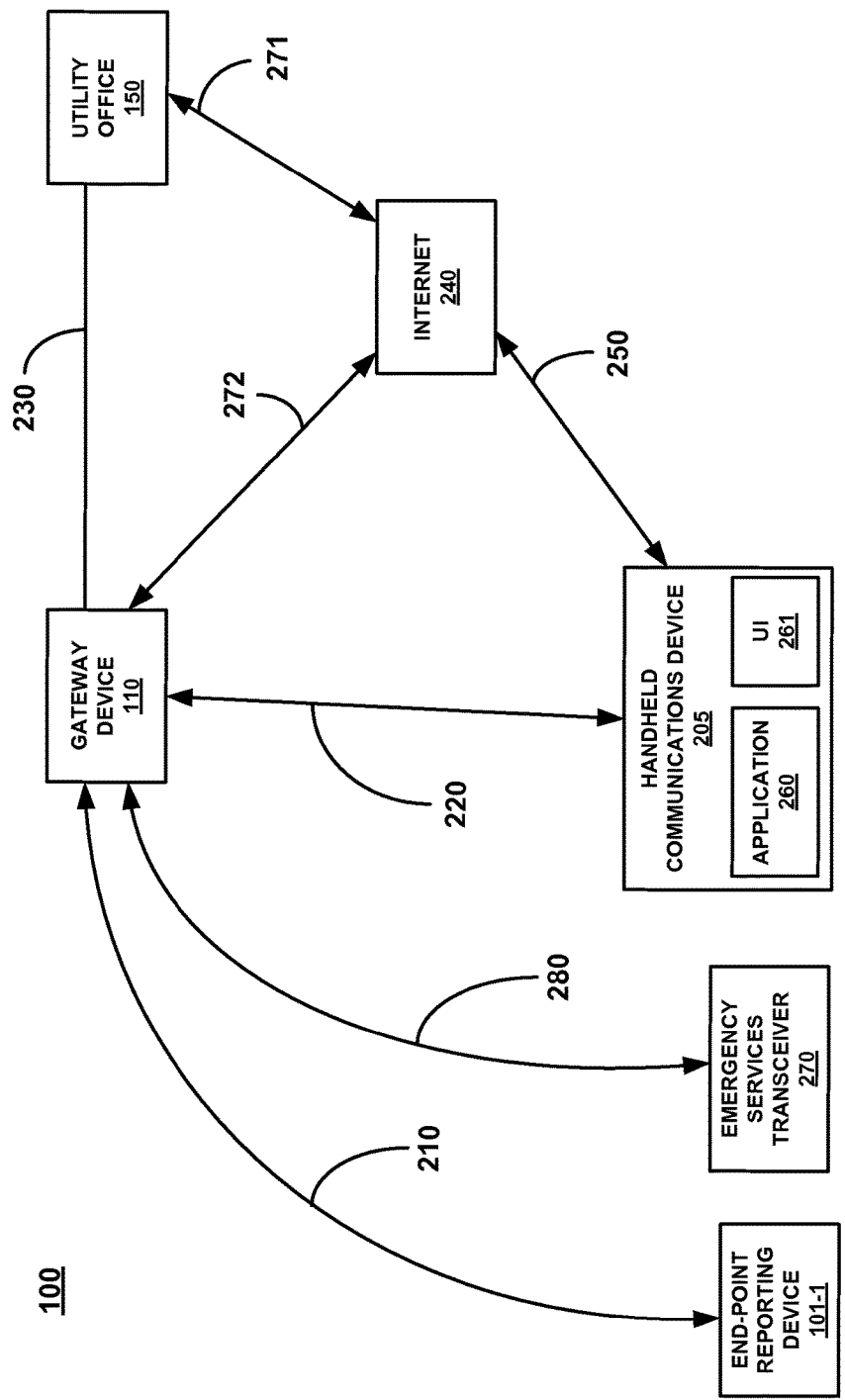
FIG. 2 shows communication links used in a utility meter reporting network in accordance with an embodiment.

FIG. 2 shows communication links used in a utility meter reporting network 100 in accordance with an embodiment. In FIG. 2, end-point reporting device 101-1 is communicatively coupled with gateway device 110 via an ISM radio link 210. The ISM radio frequency bands (e.g., 902 MHz-928 MHz) are increasingly used for short-range radio communications. In a typical utility reporting scenario, a user or vehicle is equipped with a dedicated meter-reading device which uses an ISM transceiver to receive utility usage data from a meter equipped with a, ISM transceiver. However, many companies do not want to spend the extra money to equip devices, such as data collectors or the like, with ISM circuitry, especially in devices which may have shipped with integrated Wi-Fi capabilities. For example, many companies, including utility companies, provide their field technicians with cellular telephones having integrated Wi-Fi and GNSS position determination capabilities. Thus, by implementing utility reporting network 100, a company can take advantage of existing equipment being issued to field technicians without the added cost of providing ISM communication capabilities as well. However, the user of handheld communication device 205 does not preclude a user equipped with an ISM transceiver from communicating directly with end-point reporting device 101.

In accordance with various embodiments, users of utility meter reporting network 100 can use a handheld communications device (e.g., 205 of FIG. 2) to receive utility usage data 105. In one embodiment, handheld communications device 205 is a cellular telephone. Currently, many cellular telephones come equipped with Wi-Fi circuitry embedded. Thus, there is no extra cost associated with adding ISM circuitry to handheld communications device 205. It is noted that while the present discussion will specifically cite cellular telephones, that there are a wide variety of handheld devices such as laptop computers, tablet computers, personal digital assistants (PDAs), and handheld data collectors which are also equipped with Wi-Fi capability and which can be used as handheld communications device 205. In one embodiment, handheld communications device 205 can establish communications with gateway device 110 via a Wi-Fi communication link 220 to retrieve utility usage data 105 from gateway device 110. Thus, instead of directly communicating with end-point reporting device 101, handheld communications device 205 receives utility usage data 105 from gateway device 110. It is noted that gateway device 110 can send utility usage data 105 to utility office 150 via a Wi-Fi communications link 230, via a cellular telephone link (not shown), or via a wired data connection (not shown) as well.

In accordance with various embodiments, handheld communication device 205 can establish communications with gateway device 110 via the Internet 240 using communication link 250. For example, a cellular telephone can connect with the Internet 240 using either mobile broadband services, or Wi-Fi communication links. In accordance with various embodiments, communications link 250 is a Wi-Fi link to a Wi-Fi hotspot which allows handheld communications device 205 to connect with Internet 240. In one embodiment, handheld communications device 205 connects with utility office 150 via Internet 240 and communications link 271. Then, via utility office 150, handheld communications device 205 is communicatively coupled with gateway device 110 via communications link 230. It is noted that Service Set Identification (SSID) security measures can be implemented such as a user identification and password to permit accessing gateway device 110 using handheld communications device 205. A user can log-in to a webpage, or into gateway device 110 directly using handheld communications device 205 to access data stored thereon, or to interact with end-point reporting device 101. For example, a user of handheld communications device 205 can retrieve utility usage data 105 from gateway device 110 rather than directly from end-point reporting device 101 via communications link 220. In one embodiment, when handheld communications device 205 retrieves utility usage data 105 from gateway device 110, utility usage data 105 can be deleted or over-written. In another embodiment, handheld communications device 205 connects with Internet 240 via communications link 250 and in turn connected with gateway device 110 via communications link 272.

In one embodiment, a custom user interface 261 can be downloaded onto handheld communications device 205 to facilitate interacting with gateway device 110. In another embodiment, a custom application 260 can be downloaded onto handheld communications device 205 to configure it as a utility usage data collection device. In one embodiment, the geographic position of handheld communications device 205 can assist in determining which gateway device (e.g., 110, or 111 of FIG. 1) is to be contacted. For example, using GNSS circuitry embedded in handheld communications device 205, its geographic location can be determined. In one embodiment, handheld communications device 205 can use this information to determine which gateway device 110 is closest in order to retrieve the utility usage data 105 of each end-point reporting device which reports to gateway device 110. In one embodiment, a look-up table can be accessed to correlate the current geographic position of handheld communications device 205 with the nearest gateway device 110. The operator of handheld communications device 205 can then select which gateway device (e.g., 110 of FIG. 1) to establish communications with, or alternatively, gateway device 110 can be automatically selected based upon its proximity to the current position of handheld communications device 205.

As discussed above, gateway device 110 is communicatively coupled with utility office 150 via a Wi-Fi communication link 230 (e.g., in the 2.4 GHz and/or 5 GHz frequency band). In one embodiment, Wi-Fi communication link 230, as well as wireless communication links with other gateway devices such as second gateway device 111, is compliant with the IEEE 802.11 protocols such as the 802.11.g protocol, or the 802.11.n protocol. By implementing a Wi-Fi network within utility reporting network 100, gateway devices (e.g., 110 and 111 of FIG. 1) can be meshed into a network with store and forward capabilities. In one embodiment, utility reporting network 100 can also be utilized to provide bandwidth to other services. For example, unused bandwidth in utility reporting network 100 can be sold to Internet providers in areas where wireless Internet service is not provided. Additionally, excess bandwidth of utility reporting network 100 can be reserved for emergency services such as police, fire, or ambulances to provide Internet connectivity in remote areas where radio or cellular coverage is not possible. In one embodiment, part of the radio spectrum used by wireless transceiver 420 is reserved for use by emergency responders. In FIG. 2, an emergency services transceiver 270 is communicatively coupled with gateway device 110 via Wi-Fi communications link 280. In accordance with various embodiments, emergency services transceiver 270 comprises a vehicle-mounted or handheld device (e.g., a cellular telephone, tablet computer, laptop computer, etc.) used by emergency services personnel such as police, firefighters, ambulance, or hazmat crews. In so doing, emergency service personnel can communicate via utility meter reporting network 100. This is advantageous in areas in which dedicated cellular or Wi-Fi network coverage is irregular or non-existent. Thus, rather than having to install dedicated communication networks, emergency responders can share the bandwidth of utility meter reporting network 100 and perhaps underwrite some of the costs for installing and maintaining the network.

Figure 3:
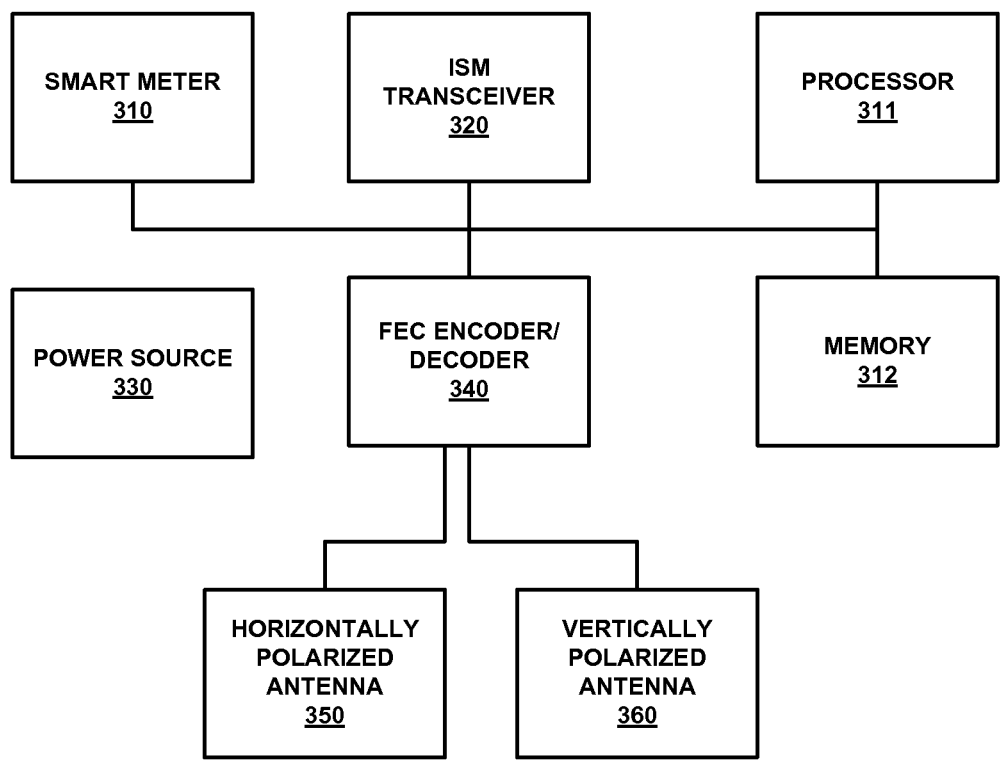
FIG. 3 is a block diagram of an end-point reporting device in accordance with an embodiment.

FIG. 3 is a block diagram of an end-point reporting device 101 in accordance with an embodiment. In the embodiment of FIG. 3, end-point reporting device 101 comprises a smart meter 310 which comprises a processor 311 for processing information and instructions and a memory 312 for storing information and instructions for processor 311. End-point reporting device 101 further comprises an ISM transceiver 320 which operates in the 900 MHz ISM band using the 902-928 MHz frequency range. In FIG. 3, ISM transceiver 320 is coupled with a horizontally polarized antenna 350 and a vertically polarized antenna 360. In accordance with various embodiments, horizontally polarized antenna 350 and vertically polarized antenna 360 can be disposed in separate enclosures, or in the same enclosure. One example of a vertically polarized antenna used in accordance with at least one embodiment is described in U.S. patent application Ser. No. 13/691,358 filed Nov. 30, 2012, titled Ruggedized Electronic Enclosure for In-ground Installation, by John F. Cameron, Larry Collins, and Daniel Shane Fitzgibbons, which is assigned to the assignee of the present application which is incorporated by reference in its entirety herein. In FIG. 3, end-point reporting device 101 further comprises power source (e.g., a battery) 330 and a Forward Error Correction (FEC) encoder/decoder 340. Forward error correction is a technique which is known in the communication arts which implements error control in communications by sending redundant data in a message. The receiver can detect errors in the original message and, in some cases, correct the error without the necessity of re-sending the original data. In accordance with various embodiments, forward error correction can increase the range of transmissions by end-point reporting device 101 by a factor of 4.

In accordance with various embodiments, ISM transceiver 320 can implement a variety of signal modulation techniques including, but not limited to, Gaussian minimum shift keying (GMSK), phase-shift keying (PSK), and 4-level frequency shift keying (4-level FSK). It is noted that, depending upon the signal modulation technique used, a particular method of performing forward error correction (FEC) may be implemented. In one embodiment, the data rate from end-point reporting device 101 is intentionally slowed to generate more energy per bit transmitted. For example, the transmission range for a message generated at a 25 kilobits/second data rate is not as great as the transmission range for a message generated at a 10 kilobits/second data rate. Thus, by intentionally selecting a lower data rate, the transmission range of end-point reporting device 101 can be extended. In accordance with various embodiments data encryption is used to protect the data from unauthorized access. Data encryption algorithms used in accordance with various embodiments include, but are not limited to, the advanced encryption standard (AES) for data encryption.

Figure 4:
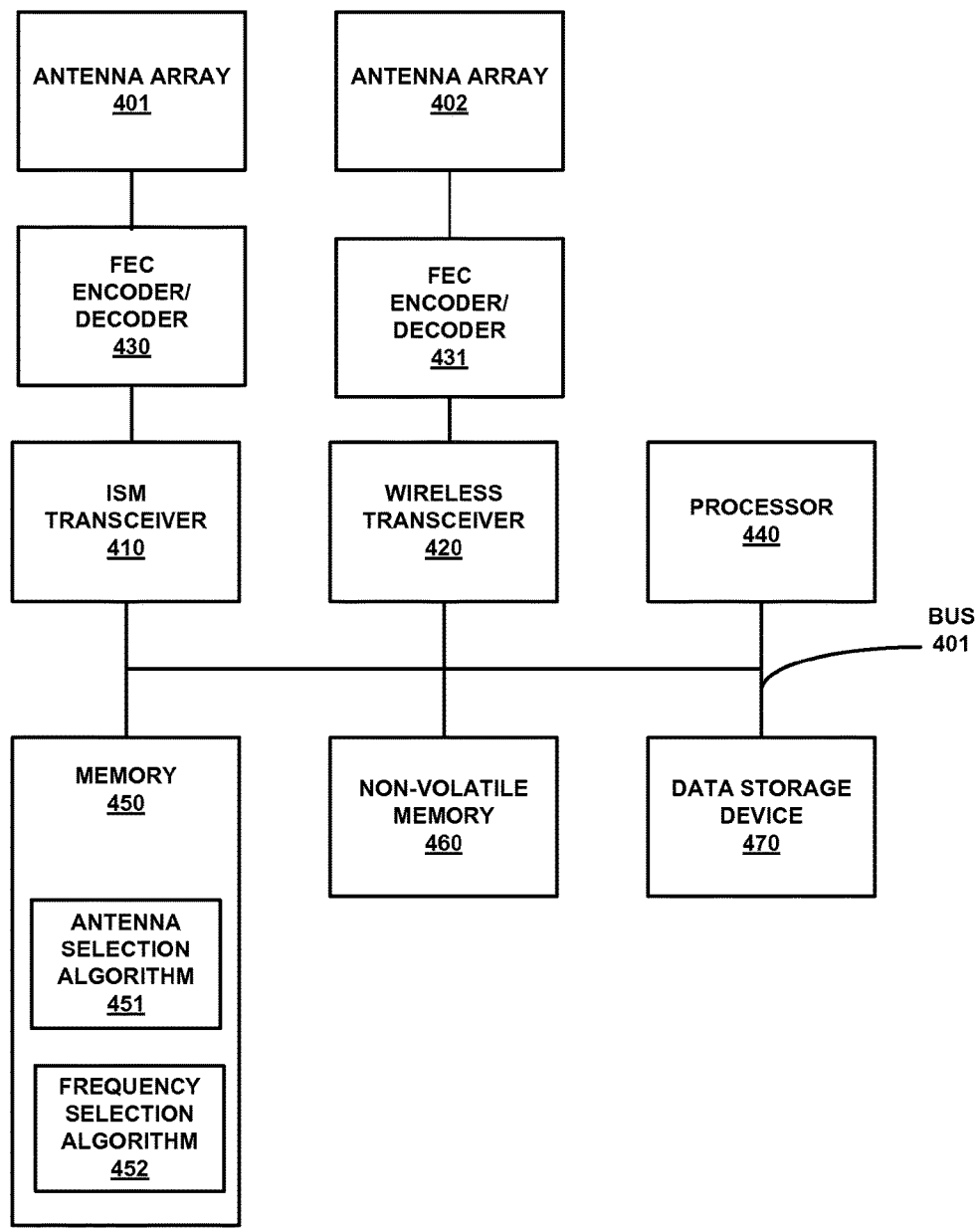
FIG. 4 is a block diagram of a gateway device in accordance with an embodiment.

FIG. 4 is a block diagram of a gateway device 110 in accordance with an embodiment. In FIG. 4, gateway device 110 comprises a processor 440, a memory 450, a non-volatile memory 460, and a data storage device 470. In accordance with various embodiments, processor 440 is for processing information and instructions. In one embodiment, memory 450 comprises random access memory (RAM) for storing information and instructions for processor 440. In one embodiment, non-volatile memory 460 comprises read only memory (ROM) for storing static information and instructions for processor 440. In various embodiments, data storage device 470 (e.g., a magnetic or optical disk and disk drive) is for long-term storage of data such as utility usage data 105 as well as for storing information and instructions. In one embodiment, data storage device 470 stores utility usage data 105 for each end-point reporting device (e.g., 101-1 to 101N) in a local network. In accordance with various embodiments, data storage device 470 stores utility usage data 105 for each end-point reporting device for a pre-determined period such as one month, two months, etc. In one embodiment, data storage device 470 can over-write older utility usage data per end-point reporting device. Also, in response to a command from processor 440, data storage device 470 can erase utility usage data 105 for a given end-point reporting device 101, or for all end-point reporting devices 101, such as when utility usage data 105 has been successfully received at utility office 150.

In FIG. 4, gateway device 110 further comprises an ISM transceiver 410 and a wireless transceiver 420. ISM transceiver 410 is configured for communicating with end-point reporting devices in the 900 MHz ISM frequency range (e.g., 902 MHz-928 MHz). It is noted that ISM transceiver 410 can also communicate with other ISM-equipped devices such as a dedicated utility usage data collector (not shown). Wireless transceiver 420 is configured for communicating in Wi-Fi networks in the 2.4 GHz and/or 5 GHz frequency ranges. In the embodiment of FIG. 4, ISM transceiver 410 is coupled with antenna array 401 via a FEC encoder/decoder 430. As described above, forward error correction is a well known error correction technique used in communications which can also extend the range of transmissions. In accordance with various embodiments, FEC encoder/decoder 430 is used in conjunction with ISM transceiver 410 to extend the range of transmissions to and from end-point reporting devices 101-1 to 101N. Similarly, wireless transceiver 420 is coupled with antenna array 402 via FEC encoder/decoder 431. FEC encoder/decoder 431 is used in conjunction with wireless transceiver 420 to implement forward error correction with, for example, utility office 150, Internet 240, handheld communications device 205, and emergency services transceiver 270. It is noted that there is no requirement that ISM transceiver 410 and/or wireless transceiver 420 routes messages through FEC encoder/decoders 430 and 431 respectively in accordance with various embodiments. In accordance with various embodiments, wireless transceiver 420 can implement a variety of signal modulation techniques including, but not limited to, Gaussian minimum shift keying (GMSK), phase-shift keying (PSK), and 4-level frequency shift keying (4-level FSK). It is noted that, depending upon the signal modulation technique used, a particular method of performing forward error correction may be implemented.

As described above, FEC encoder/decoder 430 is communicatively coupled with antenna array 401. In accordance with various embodiments, antenna array 401 is matched with ISM transceiver 410 to match the range limits afforded by a 1 watt Effective Isotropic Radiated Power (EIRP). Similarly, antenna array 402 is matched with wireless transceiver 420 to match the range limits afforded by a 1 watt EIRP as well. In accordance with at least one embodiment, antenna array 401 and antenna array 402 comprise one of a circularly polarized antenna, a vectored antenna array, or another gained antenna to realize greater transmission ranges. For example, it is likely that gateway device 110 will be mounted to a structure (e.g., a building, power/telephone pole, etc.) well above ground level (e.g., 20-30 feet). Therefore, it is not likely that gateway device 110 will be receiving signals from end-point reporting devices 101, or other gateway devices (e.g., 111 of FIG. 1) that originate above the height at which gateway device 110 is disposed, or from the horizon down to the ground. Therefore various embodiments select antenna gain to focus energy to and from known points where signals are sent or received. For example, in one embodiment, antenna array 401 can be a circularly polarized antenna which is aimed downwards to receive signals in the area. In another embodiment, antenna array 401 comprises a vectored antenna array which divides the coverage area of gateway device 110 into multiple vectors of coverage. As an example, antenna array 401 can comprise 3 antenna banks which each cover an arc of 120 degrees and which are selectively energized to increase antenna gain. Again, as gateway device 110 is operating within the constraints of 1 watt of EIRP transmission power, antenna gain is implemented to extend the range of radio transmissions in utility meter reporting network 100. This can be further aided with the knowledge of exactly where end-point reporting devices 101, repeaters 130, and other gateway devices (e.g., 111 of FIG. 1) are located. In addition, if gateway device 110 implements a schedule in which the time transmissions to/from a particular device (e.g., an end-point reporting device 101, repeater 130, gateway device 111, or utility office 150) will be transmitting, gateway device 110 can selectively energize one of the antenna banks to increase antenna gain in a particular direction. It is noted that while specific radio frequencies have been discussed above, various embodiments can utilize other radio frequencies as well. For example, the Federal Communications Commission is proposing wider availability to unused portions of the radio spectrum (e.g., referred to as "white space") to provide greater availability for wireless devices. This includes licensed commercial frequencies and ISM frequencies. Thus, in various embodiments ISM transceiver 410 and/or wireless transceiver 420 can be configured to search for frequencies (e.g., using frequency selection algorithm 452) which are outside of the frequencies cited above in compliance with emerging FCC regulations.

In accordance with one embodiment, gateway device 110 implements an antenna selection algorithm 451 resident in memory 450. In one embodiment, gateway device 110 can initiate a process with a given end-point reporting device 101 to determine which of horizontally polarized antenna 350 and vertically polarized antenna 360 provides the best signal quality at a particular time. Depending upon local conditions, signal degradation can come from various interference sources which may be moving through the area and are not persistent. In one embodiment, gateway device 110 can measure signal strength, signal-to-noise-ratio, or another metric indicative of signal quality when end-point reporting source 101 transmits data using horizontally polarized antenna 350 and vertically polarized antenna 360 and determine which antenna provides better signal quality. Gateway device 110 will then generate a message to end-point reporting device 101 instructing it as to which antenna is to be used to transmit utility usage data 105. It is noted that the selection of which of horizontally polarized antenna 350 and vertically polarized antenna 360 is to be used is a dynamic selection based upon current conditions and can change with each successive transmission of utility usage data 105.

In accordance with one embodiment, gateway device implements a frequency selection algorithm 452 resident in memory 450. It is noted that the implementation of frequency selection algorithm 452 can be performed independently, or in conjunction with antenna selection algorithm 451. Furthermore, antenna selection algorithm 451 can be performed independently as well. In accordance with various embodiments, frequency selection algorithm 452 is used to determine which particular frequency provides the best signal quality at a particular time. As with antenna selection, the local conditions when a usage report are transmitted can change dynamically so that a particular frequency in the 902 MHz-928 MHz frequency range provides better signal quality than others. For example, in one embodiment, gateway device 110 can initiate a process with an end-point reporting device 101 in which end-point reporting device sends multiple messages on respective frequencies (e.g., 902 MHz, 904 MHz, 906 MHz, etc.) to determine which frequency in the 902 MHz-928 MHz frequency range provides the best signal quality. Again, gateway device 110 can measure signal strength, signal-to-noise-ratio, or another metric indicative of signal quality when end-point reporting source 101 transmits data using each particular frequency and determine which frequency provides the best signal quality. Gateway device 110 will then generate a message instructing end-point reporting device 101 to use that frequency when transmitting utility usage data 105. In accordance with various embodiments, gateway device 110 can use a predetermined schedule in which the transmission times of utility usage data 105 from each end-point reporting device 101 are known to determine the best frequency and/or antenna selection to use when transmitting utility usage data 105 from a given end-point reporting device 101

FIG. 5 is a flowchart of a method 500 for collecting utility usage data in accordance with an embodiment. In operation 510 of FIG. 5, utility usage data 105 is sent from an end-point reporting device 101 to a gateway device 110 via first Industrial, Scientific, and Medical (ISM) radio communication link (e.g., 210 of FIG. 2) using a first ISM transceiver operable in the 902 MHz to 928 MHz range (e.g., 320 of FIG. 3).

In operation 520 of FIG. 5, the utility usage data 105 is received by a gateway device 110 using a second ISM transceiver (e.g., 420 of FIG. 4). As described above, in one embodiment repeater 130 can be used to convey the data from end-point reporting device 101 to gateway device 110. Additionally, gateway device 110 is configured to implement a frequency selection algorithm 452 which permits gateway device 110 to select which channel within the 902 MHz to 928 MHz frequency range is to be used to convey utility usage data 105. As described above, gateway device 110 can initiate a process in which end-point reporting device 101 sends a plurality of messages, each using a different channel or frequency within the 902 MHz to 928 MHz frequency range, to determine which channel provides the best signal quality. Gateway device 110 will then indicate to end-point reporting device 101 which channel is to be used when end-point reporting device 101 sends utility usage data 105. Similarly, gateway device 110 is configured to implement antenna selection algorithm 451 which permits gateway device 110 to indicate to end-point reporting device 101 which of a horizontally polarized antenna 350 and a vertically polarized antenna 360 is to be used to convey utility usage data 105. Again, gateway device 110 can initiate a process in which end-point reporting device 101 sends a first message using vertically polarized antenna 360 and a second message using horizontally polarized antenna 350 and determine which message has the best signal quality. Gateway device 110 will then send a message to end-point reporting device 101 which indicates whether to use horizontally polarized antenna 350 or vertically polarized antenna 360 when sending utility usage data 105. It is again noted that gateway device 110 utilizes a controlled gain antenna (e.g., 401 of FIG. 4) when communicating with end-point reporting device 101 and/or handheld communication device 205 and utility office 150. It is noted that end-point reporting device 101 and gateway device 110 can implement forward error correction of ISM messages (e.g., ISM radio communication link 210 of FIG. 2) using respective FEC encoder/decoders (e.g., 340 of FIGS. 3 and 430 of FIG. 4 respectively).

In operation 530 of FIG. 5, the utility usage data 105 is sent by the gateway device 110 via a Institute of Electrical and Electronics Engineers (IEEE) 802.11 compliant wireless communication link (e.g., 220, 230, or 272 of FIG. 1) using an IEEE 802.11 compliant radio transceiver (e.g., wireless transceiver 420 of FIG. 4). As described above, in one embodiment, Wi-Fi communications link 230 comprises an IEEE 802.11.g compliant communications link. Alternatively, Wi-Fi communications link 230 comprises an IEEE 802.11.n compliant communications link in accordance with another embodiment. In at least one embodiment, gateway 110 can receive a second set of utility usage data 106 from a second gateway device 111. In accordance with various embodiments, gateway device 110 can store and/or forward the second set of utility usage data 106 for second gateway device 111. In accordance with various embodiments, gateway device 110 can forward utility usage data 106 (e.g., to utility office 150 via Wi-Fi communications link 230, or to handheld communications device 205 via Wi-Fi communications links 220 or 272) and send a message to second gateway device 111 indicating that utility usage data 106 has been received. Additionally, handheld communication device 205 can access gateway device 110 via the Internet using wireless communication link 250 which can be implemented using a Wi-Fi communication link, or broadband services via a cellular communication link.

FIG. 6 is a flowchart of a method 600 for collecting utility usage data in accordance with an embodiment. In operation 610 of FIG. 6, utility usage data 105 is sent from an end-point reporting device 101 to a gateway device 110 via a first Industrial, Scientific, and Medical (ISM) radio communication link (e.g., 210 of FIG. 2) using a first ISM transceiver (e.g., 320 of FIG. 3) operable in the 902 MHz to 928 MHz range.

In operation 620 of FIG. 6, the utility usage data 105 is received by the gateway device 110 using a second ISM transceiver (e.g., 420 of FIG. 4). In accordance with various embodiments, gateway device 110 uses ISM transceiver 410 to communicate with end-point reporting device 101.

In operation 630 of FIG. 6, a cellular telephone (e.g., 205 of FIG. 2) is used to retrieve the utility usage data 105 from the gateway device 110 via an Institute of Electrical and Electronics Engineers (IEEE) 802.11 radio link (e.g., 220, or 250 of FIG. 2) implemented by the cellular telephone 205. In one embodiment, a cellular telephone (e.g., 205 of FIG. 2) can communicate directly with gateway device 110 using a Wi-Fi communications link (e.g., 220 of FIG. 2). It is noted that in one embodiment, communication links 250 and 272 of FIG. 2 are Wi-Fi links compliant with the IEEE 802.11.g specification or the IEEE 802.11.n specification. In accordance with one embodiment, a cellular telephone (e.g., 205 of FIG. 2) can connect with the Internet 240 using either mobile broadband services, or Wi-Fi communication links. In accordance with various embodiments, a cellular telephone 205 can thus be used to collect utility usage data directly from gateway device 110 for one or more end-point reporting devices 101. This can be beneficial in that a user does not have to visit the location of each end-point reporting device 101 to collect utility usage data for a region covered by gateway device 110. Additionally, gateway device 110 can be accessed by an emergency services transceiver 270 via Wi-Fi communications link 280. This can be used as a back-up source of communications for emergency responders, or to provide Internet and network communications in regions in which cellular or wireless Internet access is irregular or non-existent.

Embodiments of the present technology are thus described. While the present technology has been described in particular embodiments, it should be appreciated that the present technology should not be construed as limited to these embodiments alone, but rather construed according to the following claims.

What is claimed is:

1. A utility meter reporting network comprising:
an end-point reporting device configured to collect utility usage data and to convey said utility usage data to a gateway device via a first Industrial, Scientific, and Medical (ISM) radio communication link using an ISM transmitter operable in the 902 MHz to 928 MHz range, said end-point reporting device including a vertically polarized antenna and a horizontally polarized antenna;
said gateway device comprising an ISM receiver for receiving said utility usage data from said end-point reporting device, a storage for storing said utility usage data, and a wireless transceiver configured to send said utility usage data via an Institute of Electrical and Electronics Engineers (IEEE) 802.11 compliant wireless communication link, wherein said gateway device is configured to implement a frequency selection algorithm in conjunction with an antenna selection algorithm, wherein:
said frequency selection algorithm includes said end-point reporting device sending multiple messages at three different frequencies in the 902 MHz to 928 MHz range to said gateway device to determine which of the three different frequencies provides the highest signal-to-noise ratio as measured by said gateway device, and thereafter said gateway device generates a message instructing said end-point reporting device to use the frequency providing the highest signal-to-noise ratio when transmitting said utility usage data; and
said antenna selection algorithm includes said end-point reporting device sending a first message using said vertically polarized antenna and a second message using said horizontally polarized antenna to determine which antenna provides the highest signal-to-noise ratio as measured by said gateway device, and thereafter said gateway device generates a message instructing said end-point reporting device to use the antenna providing the highest signal-to-noise ratio when transmitting said utility usage data; and
a remote device configured to receive said utility usage data from said gateway device via said IEEE 802.11 compliant wireless communication link;
wherein said gateway device is configured to erase said utility usage data from said storage upon receipt of a confirmation of said utility usage data from said remote device;
wherein said gateway device receives said utility usage data from said end-point reporting device at a first rate when a utility malfunction is not suspected;
wherein said gateway device receives said utility usage data from said end-point reporting device at a second rate when said utility malfunction is suspected, said first rate being a periodic rate and said second rate being a continuous rate.

2. The utility meter reporting network of claim 1 further comprising:
a second gateway device configured to wirelessly receive a second set of utility usage data from a second end-point reporting device via a second ISM radio communication link and to convey said second set of utility usage data to said gateway device via said IEEE 802.11 compliant wireless communication link.

3. The utility meter reporting network of claim 1 further comprising:
a wireless repeater configured to receive said utility usage data from said end-point reporting device and to forward said utility usage data to said gateway device using a second ISM radio communication link.

4. The utility meter reporting network of claim 1 wherein said remote device is configured to access said gateway device via the Internet and to retrieve said utility usage data from said gateway device via the Internet.

5. The utility meter reporting network of claim 1 wherein said IEEE 802.11 compliant wireless communication link is compliant with the IEEE 802.11.g communication standard.

6. The utility meter reporting network of claim 1, wherein said gateway creates a schedule by implementing said frequency selection algorithm and said antenna selection algorithm at various transmission times and tracking one or more transmission times providing the highest signal-to-noise ratios.

7. The utility meter reporting network of claim 1 wherein said gateway device is configured to control the gain of an antenna coupled with said ISM receiver when receiving a message from said end-point reporting device.

8. The utility meter reporting network of claim 1 wherein said remote device is configured to directly communicate with said gateway device via a second IEEE 802.11 compliant wireless communication link and retrieve said utility usage data from said gateway device.

9. The utility meter reporting network of claim 1 wherein said end-point reporting device further comprises a Forward Error Correction (FEC) encoder/decoder coupled with said ISM transmitter and wherein said gateway device further comprises a second FEC encoder/decoder coupled with said ISM receiver.

10. A method for collecting utility usage data, said method comprising:
sending utility usage data from an end-point reporting device to a gateway device via a first Industrial, Scientific, and Medical (ISM) radio communication link using an ISM transmitter operable in the 902 MHz to 928 MHz range, said end-point reporting device including a vertically polarized antenna and a horizontally polarized antenna;
receiving said utility usage data by said gateway device using an ISM receivers;
implementing a frequency selection algorithm in conjunction with an antenna selection algorithm, wherein:
said frequency selection algorithm includes said end-point reporting device sending multiple messages at three different frequencies in the 902 MHz to 928 MHz range to said gateway device to determine which of the three different frequencies provides the highest signal-to-noise ratio as measured by said gateway device, and thereafter said gateway device generates a message instructing said end-point reporting device to use that frequency when transmitting said utility usage data; and
said antenna selection algorithm includes said end-point reporting device sending a first message using said vertically polarized antenna and a second message using said horizontally polarized antenna to determine which antenna provides the highest signal-to-noise ratio as measured by said gateway device, and thereafter said gateway device generates a message instructing said end-point reporting device to use the antenna providing the highest signal-to-noise ratio when transmitting said utility usage data; and sending said utility usage data by said gateway device to a remote device via an Institute of Electrical and Electronics Engineers (IEEE) 802.11 compliant wireless communication link using an IEEE 802.11 compliant radio transceiver;

wherein said gateway device comprises a storage for storing said utility usage data;

wherein said gateway device is configured to erase said utility usage data from said storage upon receipt of a confirmation of said utility usage data from said remote device;

wherein said gateway device receives said utility usage data from said end-point reporting device at a first rate when a utility malfunction is not suspected;

wherein said gateway device receives said utility usage data from said end-point reporting device at a second rate when said utility malfunction is suspected, said second rate being higher than said first rate.

11. The method of claim 10 further comprising:
implementing a wireless communication link which is compliant with the IEEE 802.11.g communication standard to send said utility usage data from said gateway device.

12. The method of claim 10 further comprising:
receiving at a second gateway device a second set of utility usage data from a second end-point reporting device via a second ISM radio communication link; and
conveying said second set of utility usage data to said gateway device via said IEEE 802.11 compliant wireless communication link.

13. The method of claim 10 further comprising:
receiving said utility usage data from said end-point reporting device at a wireless repeater; and
forwarding said utility usage data from said wireless repeater to said gateway device using a second ISM radio communication link.

14. The method of claim 10 further comprising:
creating a schedule by implementing said frequency selection algorithm and said antenna selection algorithm at various transmission times and tracking one or more transmission times providing the highest signal-to-noise ratios.

15. The method of claim 10 further comprising:
controlling the gain of an antenna coupled with said ISM receiver by said gateway device when receiving a message from said end-point reporting device.

16. The method of claim 10 further comprising:
communicating directly with said gateway device via a second IEEE 802.11 compliant wireless communication link using said remote device; and
receiving said utility usage data from said gateway device by remote device via said IEEE 802.11 compliant wireless communication link.

17. The method of claim 10 further comprising:
wirelessly accessing said gateway device via the Internet using said remote device; and
receiving said utility usage data from said gateway device via the Internet using said remote device.

18. The method of claim 10 further comprising:
implementing Forward Error Correction (FEC) using a first FEC encoder/decoder coupled with said ISM transmitter of said end-point reporting device and a second FEC encoder/decoder coupled with said ISM receiver of said gateway device.

19. The method of claim 10 further comprising:
accessing said gateway device using a second IEEE 802.11 compliant wireless communication link using an emergency services transceiver.

20. A method for collecting utility usage data, said method comprising:
sending utility usage data from an end-point reporting device to a gateway device via a first Industrial, Scientific, and Medical (ISM) radio communication link using an ISM transmitter operable in the 902 MHz to 928 MHz range, said end-point reporting device including a vertically polarized antenna and a horizontally polarized antenna;

receiving said utility usage data by said gateway device using an ISM receivers;

implementing a frequency selection algorithm in conjunction with an antenna selection algorithm, wherein:
said frequency selection algorithm includes said end-point reporting device sending multiple messages at three different frequencies in the 902 MHz to 928 MHz range to said gateway device to determine which of the three different frequencies provides the highest signal-to-noise ratio as measured by said gateway device, and thereafter said gateway device generates a message instructing said end-point reporting device to use that frequency when transmitting said utility usage data; and said antenna selection algorithm includes said end-point reporting device sending a first message using said vertically polarized antenna and a second message using said horizontally polarized antenna to determine which antenna provides the highest signal-to-noise ratio as measured by said gateway device, and thereafter said gateway device generates a message instructing said end-point reporting device to use the antenna providing the highest signal-to-noise ratio when transmitting said utility usage data; and using a remote device to receive said utility usage data from said gateway device via an Institute of Electrical and Electronics Engineers (IEEE) 802.11 radio link;

wherein said gateway device comprises a storage for storing said utility usage data;

wherein said gateway device is configured to erase said utility usage data from said storage upon receipt of a confirmation of said utility usage data from said remote device;

wherein said gateway device receives said utility usage data from said end-point reporting device at a first rate when a utility malfunction is not suspected;

wherein said gateway device receives said utility usage data from said end-point reporting device at a second rate when said utility malfunction is suspected, said second rate being higher than said first rate.

21. The method of claim 20 further comprising:
wirelessly accessing said gateway device via the Internet using said remote device; and
receiving said utility usage data from said gateway device via the Internet using said remote device.

22. The method of claim 20 further comprising:
accessing said gateway device using a second IEEE 802.11 compliant wireless radio link implemented by an emergency services transceiver.

* * * * *